United States Patent [19]
Hirzy

[11] 3,872,154
[45] Mar. 18, 1975

[54] TRIMELLITATES

[75] Inventor: John William Hirzy, Saint Louis, Mo.

[73] Assignee: Monsanto Company, St. Louis, Mo.

[22] Filed: Nov. 20, 1972

[21] Appl. No.: 308,220

Related U.S. Application Data

[63] Continuation-in-part of Ser. No. 74,898, Sept. 23, 1970, abandoned, which is a continuation-in-part of Ser. No. 481,928, Aug. 23, 1965, abandoned.

[52] U.S. Cl. ................... 260/475 N, 260/31.8 B
[51] Int. Cl. .............................. C07c 69/76
[58] Field of Search .................. 260/475 N

[56] References Cited
UNITED STATES PATENTS

| | | | |
|---|---|---|---|
| 2,501,610 | 3/1950 | Morris et al. | 260/475 |
| 3,046,258 | 7/1962 | Hodes et al. | 260/475 N |

*Primary Examiner*—Lorraine A. Weinberger
*Assistant Examiner*—E. Jane Skelly
*Attorney, Agent, or Firm*—Robert E. Wexler

[57] ABSTRACT

Monoallyl and diallyl trimellitates of the formula

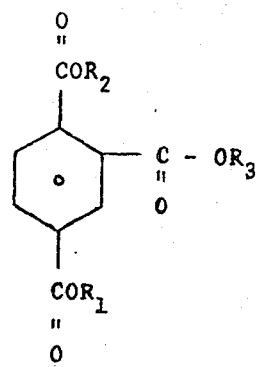

wherein $R_1$, $R_2$ and $R_3$ are selected from the group consisting of allyl, alkyl having from 1 to 18 carbon atoms and cycloalkyl having from 6 to 18 carbon atoms, at least one and no more than two of $R_1$, $R_2$ and $R_3$ being allyl and provided that only one of $R_2$ and $R_3$ may be allyl, are useful as plasticizers for halogen-containing vinyl resins.

5 Claims, No Drawings

TRIMELLITATES

This application is a continuation-in-part of copending application Ser. No. 74,898, filed Sept. 23, 1970, now abandoned which is, in turn, a continuation-in-part of application Ser. No. 481,928, filed Aug. 23, 1965, now abandoned.

This invention relates to a new class of chemical compounds. More particularly, this invention relates to novel allyl trimellitates which have been found useful as plasticizers for halogen-containing vinyl resins and as monomers.

The novel allyl trimellitates of this invention are characterized by the formula

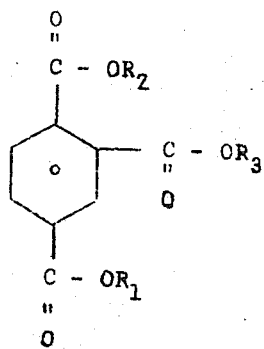

, wherein $R_1$, $R_2$ and $R_3$ are selected from the group consisting of allyl, alkyl of 1 to 18 carbon atoms and cycloalkyl of 8 to 18 carbons, at least one and no more than two of $R_1$, $R_2$ and $R_3$ being allyl; provided (a) that when one of $R_2$ and $R_3$ is allyl and $R_1$ is alkyl or cycloalkyl, the remaining R group is the same as $R_1$ and (b) that only one of $R_2$ and $R_3$ may be allyl.

It is a primary object of this invention to provide novel allyl trimellitate esters.

A further object is to provide a novel class of allyl trimellitate esters which are useful as plasticizers for halogen-containing vinyl resins.

A still further object of this invention is to provide novel plastic compositions comprising halgen-containing resins and certain trimellitate esters.

Other objects and advantages of the invention will be apparent to those skilled in the art from the following detailed description and claims.

It has been found that the heretofore described monoallyl trimellitate esters can be readily prepared by heating at a temperature of from about 50°C. to about 200°C., the anhydride of trimellitic acid, allyl alcohol, an alkyl halide and a tertiary amine.

The diallyl trimellitate esters can be readily prepared by heating at a temperature of from about 50°C. to about 200°C., the anhydride of trimellitic acid, an alkanol, an allyl halide and a tertiary amine.

It is known that diallyl alkyl trimellitates have been prepared by a process wherein, for example, 0.05 mole of trimelltic anhydride and 0.2 mole of absolute alkanol are refluxed to obtain crystals of 1-monoalkyl trimellitate and 2-monoalkyl trimellitate. The monoalkyl crystals (11 g.) and 8.9 ml. of allyl alcohol are then refluxed in the presence of 5 ml. diallyl ether as water removal agent, 2 drops of an acidic catalyst methanesulfonic acid as catalyst and 0.01 g. of hydroquinone as polymerization inhibitor to afford a product mixture of diallyl monoalkyl trimellitate.

This known process, however, produces diallyl alkyl trimellitates which contain ortho-allyl substitution, i.e., allyl groups which are ortho-oriented in relation to each other. The presence of ortho-allyl groups inevitably leads to the phenomenon recognized as "incestuous polymerization" whereby the adjacent allyl groups interact and polymerize with each other. Thus the necessity of hydroquinone in the above process as a polymerization inhibitor. The presence of hydroquinone does not, however, preclude incestuous polymerization. The result of incestuous polymerization is that the effectiveness of the diallyl ester as a cross-linking agent is reduced.

It is an important and critical aspect of the diallyl trimellitate esters of this invention that the product is substantially free of ortho-diallyl ester, thus avoiding incestuous polymerization inherent in ortho-diallyl esters.

Incestuous polymerization is schematically represented as follows:

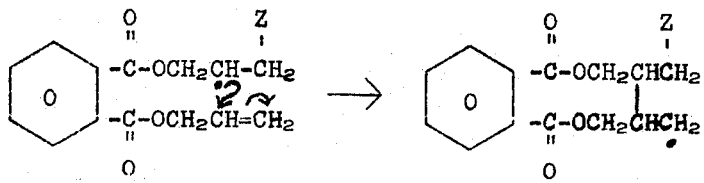

where Z is a polymerization initiator radical from a compound such as di-tert-butyl peroxide or benzoyl peroxide or an incestuously polymerized di-o-allyl phthalate molecule.

The diallyl esters of this invention are a mixture of esters wherein the allyl groups are meta or para, rather than ortho, to each other, thus preventing the intramolecular radical reaction illustrated above. It is critical in preparing the m- and p-diallyl esters of the present invention that no acidic catalyst is used which would inevitably afford ortho-diallyl substitution by equilibration of reactants.

The novel esters of this invention possess a functionality of four, required for cross-linking ability. An incestuously reacted diallyl ester has a functionality of only two, sufficient only for linear polymerization (See "Ring-Forming Polymerizations," Part A, Chapter II, by R. J. Cotter and M. Matzner).

The allyl halides which can be used in the process of this invention are allyl bromide, allyl chloride and allyl iodide.

The alkyl and cycloalkyl radicals can be derived from many sources. For example, the alkyl radicals can be straight or branched chain radicals having up to 18 carbon atoms derived from various sources such as alcohols, including alcohols produced by the oxo synthesis or alcohols obtained by catalytic dehydrogenation of coconut oil, from oxidized waxes or from esterification of a carbonyl group by reaction with an olefin. Illustrative examples of said alkyl radicals are methyl, ethyl, propyl, isopropyl, n-butyl, isobutyl, sec.-butyl, n-amyl, isoamyl, n-hexyl, isohexyl, 2-ethylhexyl, octyl, isoctyl, 2-octyl, 2-ethylheptyl, isononyl, decyl, lauryl, tetradecyl, octadecyl, etc.

Illustrative examples of cycloalkyl radicals are 2-methylcyclopentyl, 3-methylcyclopentyl, 2,4-dimethylcyclopentyl, cyclohexyl, 3-methylcyclohexyl, 4-methylcyclohexyl, 3,5-dimethylcyclohexyl, 3,3-dimethylcyclohexyl, 3-ethylcyclohexyl, 4-ethylcyclohexyl, propylcyclohexyl, 3-isopropylcyclohexyl, 4-isopropylcyclohexyl, methylcyclohexylethyl, butylcyclohexyl, hexylcyclohexyl, octylcyclohexyl, 3-nonylcyclohexyl, 4-nonylcyclohexyl, 3,3,5-trimethylcyclohexyl, cycloheptyl, 2,4-dimethylcycloheptyl, 2,3,5-trimethylcycloheptyl and the like.

The mixed alkyl radicals can be derived from mixtures of straight chain aliphatic alcohols having between 6 and about 18 carbon atoms. These are represented by the alcohols marketed by Continental Oil Company under the tradename Alfol 610, Alfol 810, Alfol 1214, Alfol 1216 and Alfol 1618 and alcohols marketed by Archer Daniels Midland Company under the tradename Adol 9, Adol 12, Adol 52 and Adol 63. Alfol 610 is a mixture of saturated straight chain hydrocarbon monohydric alcohols having the following approximate composition: 20% $C_6$ alcohols, 35% $C_8$ alcohols and 44% $C_{10}$ alcohols. Alfol 810 consists primarily of 43% $C_8$ alcohols and 55% $C_{10}$ alcohols. Alfol 1214 comprises approximately 55% $C_{12}$ alcohols and 43% $C_{14}$ alcohols. Alfol 1216 has a composition approximating 63% $C_{12}$ alcohols, 24% $C_{14}$ alcohols and 10% $C_{16}$ alcohols. Alfol 1618 contains primarily 2% $C_{14}$ alcohols, 63% $C_{16}$ alcohols, 30% $C_{18}$ alcohols and 2% $C_{20}$ alcohols. Adol 9 is a mixture of straight chain fatty alcohols having the following approximate composition: 55% $C_8$ alcohols, 35% $C_{10}$ alcohols and 10% $C_{12}$ alcohols. Adol 12 consists primarily of 2% $C_{10}$ alcohols, 90% $C_{12}$ alcohols and 8% $C_{14}$ alcohols. Adol 52 has an approximate composition of 4% $C_{14}$ alcohols, 90% $C_{16}$ alcohols and 6% $C_{18}$ alcohols. Adol 63 comprises 1% $C_{12}$ alcohols, 6% $C_{14}$ alcohols, 30% $C_{16}$ alcohols, 60% $C_{18}$ alcohols and 3% $C_{22}$ alcohols.

The allyl halide reactant of this invention can be represented by YX, where Y is a straight or branched chain alkyl radical containing up to 20 carbon atoms and X is a halogen atom, such as chlorine, bromine and iodine atoms, with a preference in that order. It is preferred that YX be an alkyl halide containing 4 to 20 carbon atoms.

As illustrative of the preferred alkyl halide reactants of this invention are n-butyl chloride, n-butyl bromide, sec.-butyl chloride, n-amyl chloride, isoamyl chloride, sec.-amyl chloride, sec.-amyl iodide, n-amyl bromide, n-hexyl chloride. isohexyl chloride, sec.-hexyl chloride, 2-chlorohexane, n-heptyl chloride, isoheptyl chloride, 2-chloroheptane, n-octyl chloride, n-octyl bromide, n-octyl iodide, isooctyl chloride, 2-chlorooctane, 4-chlorooctane, 2-ethylhexyl chloride, 2-chlorononane, 3-chlorononane, 2-chlorodecane, n-decyl chloride, 3-chlorodecane, undecyl chloride, 2-chloroundecane, n-dodecyl chloride, n-dodecyl bromide, 2-chlorododecane, 2-bromododecane, 3-chlorododecane, tridecyl chloride, tetradecyl chloride, pentadecyl chloride, hexadecyl chloride, octadecyl chloride, octadecyl bromide, eicosyl chloride, cyclohexyl bromide, cyclohexyl chloride, cyclohexyl iodide, and the various isomers thereof and various mixtures thereof, as, for example, those obtained upon mono-chlorinated alkane fractions obtained from petroleum. Particularly suitable alkanes are those obtained from petroleum fractions boiling at atmospheric pressure in the range of about 30°C. to about 300°C., such as pentane cut from gasoline boiling from about 30°C. to about 40°C., a ligroin boiling from about 90°C. to about 120°C., a benzene boiling from about 120°C. to about 150°C., and a kerosene boiling from about 150°C. to about 235°C.

Tertiary amines suitable for use in preparing the compounds of this invention can be represented by the formula

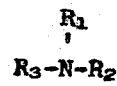

wherein:

$R_1$, $R_2$ and $R_3$ are like or unlike saturated aliphatic radicals. Preferably, $R_1$, $R_2$ and $R_3$ have a total of 3 to 24 carbon atoms, and it is also preferred that $R_1$, $R_2$ and $R_3$ be alkyl radicals. Non-limiting examples of such tertiary amines are trimethylamine, triethtylamine, tri-n-propylamine, triisopropylamine, tri-n-butylamine, triisoamylamine, trihexylamine, methyldiethylamine, dimethylethylamine, dimethylcyclohexylamine, dimethylhexylamine, diethylhexylamine, dimethyldecylamine and the like.

The invention will be more readily understood by reference to the following examples which describe the detailed preparation of representative compounds. There of, of course, many other forms of this invention which will become obvious to one skilled in the art and it will accordingly be recognized that these examples are given for the purpose of illustration only and are not to be construed as limiting the scope of this invention in any way.

EXAMPLE 1

To a suitable reaction vessel having means for the addition and removal of heat, means for measuring the temperature of the reaction mass, means for agitating the reaction mass, means for the addition and removal of solids and liquids and fitted with a condenser, there is charged 192.0 grams (1.0 mole) of trimellitic anhydride, 78.0 grams (1.05 moles) of n-butanol and 169.0 grams (2.2 moles) of allyl chloride. The mixture is heated to about 55°C. and there is then added 253.0 grams (2.5 moles) of triethylamine. The reaction mixture is then held at a temperature of about 115°C. for 4 hours and then washed with several water and lye washes. The resultant reaction mixture is then steam sparged, dehydrated under vacuum and filtered. There is obtained 263.0 grams (76% of theory) of a mixture of m- and p-diallyl-n-butyl trimellitate.

EXAMPLE 2

Following the procedure of Example 1, 192.0 grams (1.0 mole) of trimellitic anhydride, 136.5 grams (1.05 moles) of 2-ethylhexanol, 169.0 grams (2.2 moles) of allyl chloride and 253.0 grams (2.5 moles) of triethylamine are utilizied to prepare a mixture of m- and p-diallyl 2-ethylhexyl trimellitate in excellent yield.

EXAMPLE 3

Following the procedure of Example 1, 192.0 grams (1.0 mole) of trimellitic anhydride, 210.0 grams (1.05 moles) of tridecanol, 169.0 grams (2.2 moles) of allyl chloride and 253.0 grams (2.5 moles) of triethylamine are utilized to prepare a mixture of m- and p-diallyl tridecyl trimellitate in good yield.

EXAMPLE 4

A suitable reaction vessel is charged with 192.0 grams (1.0 mole) of trimellitic anhydride, 110.0 grams (1.1 moles) of cyclohexanol and 255.0 grams (2.1 moles) of allyl bromide. The mixture is heated to about 55°C. and 233.0 grams (2.3 moles) of triethylamine is added. The reaction mixture is then held at a temperature of about 115°C. for about 3 hours and then washed several times with water and lye washes. The resultant reaction mixture is then steam sparged and dehydrated under vacuum. There is obtained 190 grams (51% of theory) of a mixture of m- and p-diallyl cyclohexyl trimellitate.

EXAMPLES 5 – 8

Following the procedure of Example 1, 1.05 moles of each of the following alkanols tabulated is substituted for the n-butanol. The product obtained in each instance is as indicated.

| 5. | Alkanol = | ethanol |
| | Product = | mixture of m- and p-diallyl ethyl trimellitate |
| 6. | Alkanol = | n-hexanol |
| | Product = | mixture of m- and p-diallyl n-hexyl trimellitate |
| 7. | Alkanol = | decanol |
| | Product = | mixture of m- and p-diallyl decyl trimellitate |
| 8. | Alkanol = | 4-nonylcyclohexanol |
| | Product = | mixture of m- and p-diallyl 4-nonylcyclohexyl trimellitate |

EXAMPLE 9

A suitable reaction vessel is charged with 384.0 grams (2.0 moles) of trimellitic anhydride, 380.0 grams (5.0 moles) of allyl chloride and 232.0 grams (2.2 moles) of a mixture of straight chain alcohols containing from about 20% hexyl alcohols, 35% octyl alcohols and 44% decyl alcohols. There is then added 444.0 grams (4.4 moles) of triethylamine. The reaction mixture is then held at a temperature of about 130°C. for about 3 hours and washed several times with water and aqueous sodium carbonate washes. The resultant reaction mixture is then steam sparged and dehydrated under vacuum. There is obtained 553.0 grams (69% of theory) of a mixture of m- and p-diallyl ($C_6$–$C_{10}$ allyl) trimellitate.

EXAMPLE 10

A suitable reaction vessel is charged with 192.0 grams (1.0 mole) of trimellitic anhydride, 74.0 grams (1.27 moles) of allyl alcohol and 265.0 grams (2.20 moles) of n-hexyl chloride. 233.0 grams (2.30 moles) of triethylamine are then added to the mixture. Upon completion of the addition of the triethylamine, the temperature of the reaction mixture is held at about 110°C. for an additional hour. The resultant reaction mixture is then washed several times with water and lye washes, steam sparged and dehydrated. There is obtained 301.0 grams (72% of theory) of allyl di-n-hexyl trimellitate.

EXAMPLE 11

Following the procedure of Example 10, 192.0 grams (1.0 mole) of trimellitic anhydride, 74.0 grams (1.27 moles) of allyl alcohol, 203.8 grams (2.2 moles) of butyl chloride and 233.0 grams (2.30 moles) of triethylamine are utilized to prepare allyl butyl trimellitate in good yield.

EXAMPLE 12

Following the procedure of Example 10, 192.0 grams (1.0 mole) of trimellitic anhydride, 74.0 grams (1.27 moles) of allyl alcohol, 326.5 grams (2.2 moles) of 1,2-ethylhexyl chloride and 233.0 grams (2.30 moles) of triethylamine are utilized to prepare allyl di-2-ethylhexyl trimellitate in excellent yield.

EXAMPLE 13

Following the procedure of Example 10, 192.0 grams (1.0 mole) of trimellitic anhydride, 74.0 grams (1.27 moles) of allyl alcohol, 448.0 grams (2.2 moles) of 1-chlorododecane and 233.0 grams (2.30 moles) of triethylamine are utilized to prepare allyl didodecyl trimellitate in excellent yield.

EXAMPLES 14 – 17

Following the procedure of Example 10, 2.2 moles of each of the following alkyl halides tabulated is substituted for the n-hexyl chloride. The product obtained in each instance is as indicated.

| 14. | Alkyl halide | = n-propyl bromide |
| | Product | = allyl dipropyl trimellitate |
| 15. | Alkyl halide | = 1-chlorooctane |
| | Product | = allyl dioctyl trimellitate |
| 16. | Alkyl halide | = tridecyl chloride |
| | Product | = allyl ditridecyl trimellitate |
| 17. | Alkyl halide | = octadecyl chloride |
| | Product | = allyl dioctadecyl trimellitate |

EXAMPLE 18

A suitable reaction vessel is charged with 192.0 grams (1.0 mole) of trimellitic anhydride and 74.0 grams (12.7 moles) of allyl alcohol. The mixture is heated to about 70°C. and there is then added 250.0 grams (2.48 moles) of triethylamine. Upon completion of the addition of the triethylamine there is added 575.0 grams (2.12 moles) of 1-iododecane. The reaction mixture is held at a temperature of about 125°C. for 2 hours and then washed several times with water and lye washes. The resultant reaction mixture is then steam sparged and dehydrated under vacuum. There is obtained 404 grams (76% of theory) of allyl didecyl trimellitate.

As previously stated, the products of this invention are useful as plasticizers for vinyl halide-containing polymers. The advantageous properties possessed by the esters of this invention will be more fully understood by reference to the following examples.

The following testing procedures are used in evaluating the physical properties of plasticizers.

Compatibility — Visual inspection of the plasticized composition is employed, incompatibility of the plasticizer with the polymer being demonsrated by cloudiness and exudation of the plasticizer.

Low-temperature flexibility — Low-temperature flexibility is one of the most important properties of elastomeric vinyl compositions. While many plasticizers will produce flexible compositions at room temperature, the flexibility of these compositions at low temperature may very considerably, i.e., plasticized polyvinyl chloride compositions that are flexible at room temperature often become very brittle and useless at lower temperatures. Low-temperature flexibility tests employed herein are according to the Clash-Berg Method. This method determines the torsional flexibility of a plastic at various temperatures. The temperature at which the vinyl composition exhibits an arbitrarily established minimum flexibility is defined as the low-temperature flexibility of the composition. This value may also be defined as the lower temperature limit of the plasticized composition's usefulness as an elastomer.

Volatility — A decrease in plasticizer concentration, when caused by volatilization of the plasticizer, often results in decreased flexibility of a plasticized polymer composition. Hence, plasticizers which are readily volatilized from the plasticized composition as a result of aging or heating are inefficient because, upon volatilization, the plasticized compositions become stiff and hard. The test for plasticizer volatility employed herein is that described by the American Society for Testing Materials under the designation D-1203-55T.

Water resistance — The amount of water absorption and the amount of water leaching that take place when the plasticized composition is immersed in distilled water for 24 hours is determined.

Kerosene extraction — Resistance to kerosene is measured as follows: A 2 inches in diameter, 40 mil. disc is suspended in a 50°C. oven for a 3-hour conditioning period to eliminate water, then cooled and weighed. The conditioned sample is then immersed in 400 ml. of kerosene for a period of 24 hours at 23°C. The sample is then removed from kerosense, blotted dry and suspended in a forcedraft 80°C. oven for 4 hours. The sample is then cooled and weighed. The percent loss in weight is reported as the kerosene extraction value.

Hardness — A standard instrument made by Shore Instrument Company is used for this determination and expresses the hardness in units from 1 to 100. The hardness of the composition is judged by its resistance to the penetration of a standard needle applied to the composition under a standard load for a standard length of time.

The following examples illustrate the advantageous and unexpected results which are achieved by the use of the esters of the present invention in vinyl halide-containing polymers, but it is not intended that the invention be limited by or to such examples.

EXAMPLE 19

One hundred parts by weight of polyvinyl chloride and 60 parts by weight of a mixture of m- and p-diallyl n-butyl trimellitate obtained in Example 1 are mixed on a rolling mill to a homogeneous blend. During the milling, substantially no fuming or discoloration is observed. Testing of the molded sheet for low-temperature flexibility, according to the procedure described above, gives a value of −19.8°C. A test of the volatility characteristics of the composition given a value of 5.2%. Tests of the water resistance of the plasticized material show a loss of soluble matter of 0.05% and a 0.92% water absorption value. A test of the kerosene extraction characteristics of the composition gives a value of 1.3%. A Shore hardness value of 73 is obtained on this composition.

EXAMPLE 20

One hundred parts by weight of polyvinyl chloride and 60 parts by weight of a mixture of m- and p-diallyl cyclohexyl trimellitate obtained in Example 4 are mixed on a rolling mill to a homogeneous blend. During the milling, substantially no fusing or discoloration is observed. Testing of the molded sheet for low-temperature flexibility gives a value of −7.2°C. A test of the volatility characteristics of the composition gives a value of 2.9%. Tests of the water resistance of the plasticized material show a loss of soluble matter of 0.05% and a 0.29% water absorption value. A test of the kerosene extraction characteristics of the composition gives a value of 0.5%. A Shore hardness value of 76 is obtained on this composition.

EXAMPLE 21

One hundred parts by weight of polyvinyl chloride and 60 parts by weight of allyl di-n-decyl trimellitate obtained in Example 18 are mixed on a rolling mill to a homogeneous blend. During the milling, substantially no fuming or discoloration is observed. Testing of the molded sheet for low-temperature flexibility gives a value of −41.3°C. A test of the volatility characteristics of the composition gives a value of 0.8%. Tests of the water resistance of the plasticized material show a loss of soluble matter 0.00% and a 0.16% water absorption value. A test of the kerosene extraction characteristics of the composition gives a value of 1.2%. A Shore hardness value of 80 is obtained on this composition.

EXAMPLE 22

One hundred parts by weight of polyvinyl chloride and 60 parts by weight of allyl di-n-hexyl trimellitate obtained in Example 10 are mixed on a rolling mill to a homogeneous blend. During the milling, substantially no fuming or discoloration is observed. Testing of the molded sheet for low-temperature flexibility, according to the procedure described above, gives a value of −31.9°C. A test of the volatility characteristics of the composition gives a value of 0.8%. Tests of the water resistance of the plasticized material show a loss of soluble matter of 0.01% and a 0.20% water absorption value. A test of the kerosene extraction characteristics of the composition gives a value of 4.8%. A Shore hardness value of 69 is obtained on this composition.

Other compounds within the scope of this invention are found to possess properties of a similar nature.

While this invention has been described with respect to certain embodiments, it is not so limited, and it should be understood that variations and modifications may be made which are obvious to those skilled in the art without departing from the spirit or scope of the invention.

The embodiments of the invention in which an exclusive property or privilege is claimed are defined as follows:

1. A monoallyl trimellitate of the formula

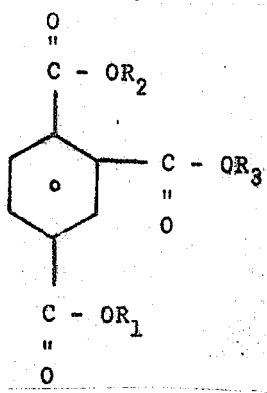

, wherein one of $R_2$ and $R_3$ is allyl and the remaining R groups are like radicals selected from the group consisting of alkyl of 1 to 18 carbon atoms and cycloalkyl of 6 to 18 carbon atoms.

2. A compound of claim 1 which is allyl di-n-hexyl trimellitate wherein the n-hexyl groups are meta or para oriented with respect to each other.

3. A compound of claim 1 which is allyl didecyl trimellitate wherein the didecyl groups are meta or para oriented with respect to each other.

4. A compound of claim 1 which is allyl di-2-ethylhexyl trimellitate wherein the di-2-ethylhexyl groups are meta or para oriented with respect to each other.

5. A compound of claim 1 wherein the remaining R groups are like alkyl radicals of 1 to 18 carbon atoms.

* * * * *

UNITED STATES PATENT OFFICE
CERTIFICATE OF CORRECTION

PATENT NO. : 3,872,154

DATED : March 18, 1975

INVENTOR(S) : John William Hirzy

It is certified that error appears in the above—identified patent and that said Letters Patent are hereby corrected as shown below:

Column 1, line 39, "8 to 18 carbons" should be corrected to read -- 6 to 18 carbons --.

Column 3, line 43, "allyl" should be corrected to read -- alkyl --.

Column 5, line 53, "allyl" should be corrected to read -- alkyl --.

Column 6, line 13, "1.2-" should be corrected to read -- 1,2- --.

Signed and sealed this 17th day of June 1975.

(SEAL)
Attest:

RUTH C. MASON
Attesting Officer

C. MARSHALL DANN
Commissioner of Patents
and Trademarks